United States Patent [19]

Egli

[11] 4,208,368

[45] Jun. 17, 1980

[54] METHOD AND APPARATUS FOR INJECTION MOLDING FOAMED PLASTIC ARTICLES USING A PRE-PRESSURIZED MOLD HAVING FIXED CORE MEMBERS WITH CONTROLLED VENTING

[75] Inventor: Ernst Egli, Bischofszell, Switzerland

[73] Assignee: Gebrüder Buhler AG, Switzerland

[21] Appl. No.: 925,959

[22] Filed: Jul. 18, 1978

[51] Int. Cl.² ............................................. B29D 27/00
[52] U.S. Cl. ................................. 264/45.5; 264/40.3;
264/51; 264/328; 264/DIG. 14; 264/DIG. 83;
425/162; 425/546; 425/812; 425/817 R
[58] Field of Search .............. 264/DIG. 83, 328, 45.5,
264/51, 40.3, DIG. 14; 425/162, 546, 812, 817 R

[56] References Cited

U.S. PATENT DOCUMENTS 3,991,146  11/1976  Barrie ............................... 264/328 X
4,153,231   5/1979  Hayakawa et al. .............. 425/546 X

FOREIGN PATENT DOCUMENTS 2335310  2/1975  Fed. Rep. of Germany ... 264/DIG. 83

Primary Examiner—Philip Anderson
Attorney, Agent, or Firm—McGlew and Tuttle

[57] ABSTRACT

A method of molding articles of plastic having an expanded plastic cellular core using a closable and sealable mold having a sealed mold cavity and including at least one mold core extending into the cavity, comprises, directing the plastic melt material containing a foaming agent into the mold cavity under pressure so as to form a flow front of the melt which progresses through the cavity and which spreads out in all directions and flows around the mold core and tends to form a pocket of gas in the vicinity of the mold core, and venting the cavity adjacent the core so as to remove gas from any gas pocket which may be formed in the vicinity of the core. The apparatus for carrying out the invention includes a vent line which extends from the cavity in the vicinity of the mold core out of the cavity and which has a control valve for opening the vent line to vent any gas which forms in the cavity and which might tend to form a pocket after the buildup of a pressure in the mold cavity. The vent passage includes at least one capillary-action, gas-pervious passage portion. The vented area advantageously comprises an intermediate space formed between the two mold cores which are connected with a vent line through a very small diameter intermediate space between the core and the hole in the mold cavity containing the vent core. The construction may also advantageously include an ejector plate having pins which penetrate to sealed areas of one of the mold parts and extends into the cavity through an enlarged chamber portion which communicates with the cavity through small diameter capillary-size holes.

18 Claims, 3 Drawing Figures

METHOD AND APPARATUS FOR INJECTION MOLDING FOAMED PLASTIC ARTICLES USING A PRE-PRESSURIZED MOLD HAVING FIXED CORE MEMBERS WITH CONTROLLED VENTING

FIELD AND BACKGROUND OF THE INVENTION

This invention relates to a method and apparatus for producing molded articles and, in particular, for molding articles having an outer skin and a porous or cellular core in which a gas counter pressure is maintained at a controlled level in a mold during injection of a plastic material having a foaming agent.

DESCRIPTION OF THE PRIOR ART

It is known to produce articles by injection molding of a melt of plasticized plastics material containing expanding agent into a mold cavity, in which a gas counter-pressure prevails to prevent the expansion of the expanding agent during the mold filling operation, and from which the gas is displaced by the melt as the filling of the mold progresses. In order to obtain so-called structural foam articles of this kind which have a smooth surface, it is known for the plastics material melt mixed with an expanding agent, referred to hereinafter simply as the melt, to be injected against the pressure of a gas previously introduced into the mold cavity at a supply point.

The injection pressure is always greater than the counter-pressure of the gas, but the counter-pressure is greater than the expansion pressure of the expanding agent in order to prevent foaming of the melt before the mold filling operation is completed.

Due to these pressure conditions, with a substantially constant counter-pressure, the gas recedes before the flow front of the melt filling the mold cavity, back through the discharge point which is also the supply point, and when the filling of the mold is completed, the gas should have been displaced completely from the mold cavity.

However, inexperience shows that this is true only in the case of injection molding molds for structural foam parts of quite simply geometry, and even with these, the gas is not always completely displaced from the mold cavity.

In some cases, tests have shown that the flow front of the melt forms flow shadows or traps from which the gas cannot flow out evenly in the injection molding of molded parts of relatively simple shape. This kind of behavior becomes more and more apparent when complicated structural foam parts with several recesses or apertures have to be produced. In such cases, the gas often remains trapped by the melt in spaces between the mold cores which are provided to form such recesses.

The melt is thus prevented from filling these intermediate spaces, resulting in the molded parts being unusable.

SUMMARY OF THE INVENTION

The present invention provides an improved method for injection molding of expanded plastics articles. According to one of its aspects, the invention provides a method which, during the moldfilling operation, gas inclusions which remain behind the flow front of the melt are relieved of pressure and removed from the mold cavity directly after they have been occluded by the melt.

This method makes it possible for a gas cushion which has just been enclosed and which obstructs the melt to be cleared out of the way before the setting flow front solidifies, so that the mold cavity is filled without leaving a gap.

For pressure relief of the gas inclusions and for removing them from the mold cavity, the gas-perviousness of the capillary action venting passages may be advantageously used in conjunction with the inability of the melt to penetrate into such venting passages because of its surface tension. The pressure relief and clearing away of the gas inclusions are conveniently controlled separately from one another in space and time. It is preferable to carry out the control separately as regards space and time in accordance with a program adapted to the mold filling operation.

Apparatus is known for producing expanded plastics articles with an expanded thermoplastics injection-molding machine having a split injection molding mold whose mold cavity in the closed state is adapted to be pressure loaded by means of a gas and to be cleared gradually of the gas charge during the mold filling operation by means of a duct constructed in the injection molding mold and a charging/discharging valve preceding that duct.

Several proposals are known for an apparatus for carrying out a gas counter-pressure method with displacement of gas from the mold cavity by the melt. They all relate to injection molding molds for structural foam parts of simple geometric construction and, accordingly, all propose the use of a discharge valve which simply allows the gas to flow out from the entire mold cavity.

To produce complicated structure foam parts with a smooth surface, on the other hand, apparatus is known which uses either the method of mold cavity volume variation, or the so-called two-phase gas counter-pressure method.

As is known, in the first case, the volume of the mold cavity can be reduced by means of a plunger arranged for displacement in the injection molding mold in order to prevent the foaming of the melt during the mold filling operation. Additionally, a gas counter-pressure can also be used, with gas being introduced into the mold cavity by way of a charging/discharging valve before the beginning of the mold filling operation, and then discharged from the cavity during the mold filling operation.

In the second case, the gas counter-pressure built up previously in the mold cavity by way of a charging valve is increased during a first phase of the mold filling operation, possibly with the use of a second charging valve, and the higher pressure is kept constant in a subsequent second phase until the mold-filing operation is completed, with the gas flowing out through a discharge valve.

The invention also provides an improved injection molding apparatus for molding expanded plastics articles. According to another of its aspects, the invention provides an apparatus which includes sections of a mold cavity in which the flow front of the melt closes the path of escape of the gas by way of the duct to the charging or discharging valve means during the mold-filling operations. The wall of the mold cavity is provided with at least one capillary-action gas-pervious arrangement which can be connected with the free atmosphere by means of at least one relief chamber and a shutoff valve associated with the relief chamber.

The capillary-action gas-pervious arrangements at the places where there is a danger of gas inclusions, controlled by means of the relief chambers by the shutoff valves, allow for the gas inclusions to be immediately broken down at the technologically necessary instant of time in accordance with the degree to which the mold has been filled during the mold-filling operation.

Undesired passage of the still liquid melt through the arrangement, which would thus block the arrangement and produce surface defects on the molded article, for example, the formation of flash, can be obviated.

For example, in a first constructional form of the apparatus utilizing the invention, in which the injection molding mold is to have several mold cores corresponding to a number of recesses to be provided in the molded part, it is possible to arrange each of the mold cores securely in a recess of a mold, half of the injection molding mold. It is preferable to provide a gas-pervous gap in the region of the recess adjacent the mold cavity between the wall thereof and the mold core, through which the melt cannot penetrate, to provide a chamber adjacent the gap in that region of the recess between the wall thereof, and the mold core which is remote from the mold cavity, and to arrange a venting duct after the chamber which leads to the shutoff valve and which has a cross-section corresponding to the through-flow ability of the chamber.

By the secure arrangement of the mold cores in the recesses, it is possible to prevent escape of the gas counter-pressure from the mold cavity earlier than is technologically necessary.

The passage of the melt between the mold core and the wall of the recess is advantageously prevented by selecting a gap width into which the melt does not penetrate because of its surface tension determined by it viscosity. A gap of a few hundredths of a millimeter is provided, preferably a gap of 0.02 to 0.04 mm.

By constructing the chamber following the gap and the venting duct connected thereto with the same through-flow capacity, a rapid discharge of gas inclusions without anything to hold back the flow is effected. To form the chamber, the mold cores can be arranged in the region of the recesses remote from the mold group, set back from the wall of the recesses.

In a convenient arrangement, the recesses for the molding cores, together with the venting ducts, are constructed in the mobile half of the injecting molding mold. It is particularly advantageous if each of the relief chambers has a remote-controlled shutoff valve associated with it, and the remote control connections of all the shutoff valves are connected to a programmable arrangement for controlling the injection operation.

In a second constructional form of apparatus utilizing the invention, a gas-pervious gap is provided in each case between the ejector pins and the wall of the holes receiving these pins in the end region of these holes opening into the mold cavity, and, in the connection to the gap, an annularly widened chamber is formed, with each of the chambers again being in control connection with the associated shutoff valve by way of a venting duct in each case.

Accordingly, it is an object of the invention to provide an improved method of molding articles of plastic having an expanded plastic cellular core and using a closable and sealable mold having a sealed mold cavity and at least one mold core extending into the cavity which comprises directing the plastic material melt containing a foaming agent into the mold cavity under pressure so as to form a flow front of the melt which progresses through the cavity and which spreads out in all directions and flows around the mold core and tends to form a pocket of gas in the intermediate shadow space adjacent the mold core, and venting the cavity or shadow space adjacent the core so as to remove gas from any pocket which may form in the vicinity of the core.

A further object of the invention is to provide an apparatus for molding plastic articles which include a porous core, comprising, a mold which has a sealable mold cavity with a screw connected into the cavity for injecting the plastic melt into the cavity and with at least one mold core projecting into the cavity around which the plastic melt flows to tend to cause a gas pocket to form and further including a vent line extending from the cavity in the vicinity of the mold core out of the cavity and valve control means associated with the vent line to open the vent line to vent the gas which forms in the cavity after the buildup of gas therein so as to vent any gas tending to form a pocket.

Another object of the invention is to provide an apparatus for molding plastic articles which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENTS

Figure 1:
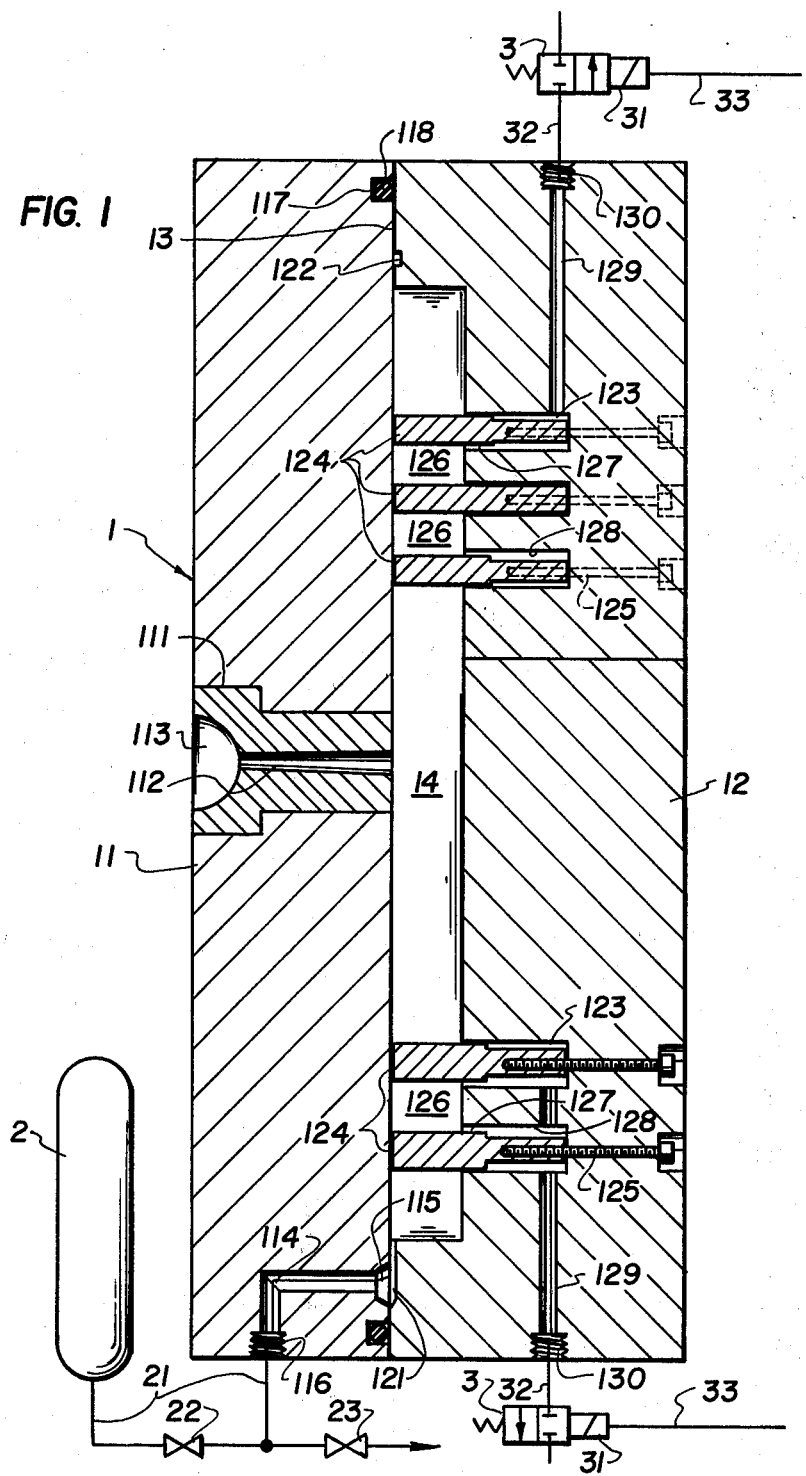
FIG. 1 is a vertical section taken along the line A—A of FIG. 2 of an injection molding mold for the production of structural foam parts, constructed in accordance with the invention.

Referring to the drawings in particular, the invention embodied therein, comprises, an apparatus for molding plastic articles which have a porous core which comprises a mold, generally designated 1, having a cavity 14 therein, which is filled with a plastic melt material through a sprue duct 112 of a sprue block 113 which is mounted on a fixed mold portion 11 and has a spherical cavity 113 to receive an injection head. The fixed mold 11 cooperates with a movable mold 12 and the melt material which is directed into the cavity 14 moves out in all directions and flows around at least one mold core 124.

FIG. 1 shows an injection molding mold 1 in cross-section, into which a gas counter-pressure can be admitted. It is used in an expanded thermoplastics injection molding machine of a known construction, referred to hereinafter as an ETI machine, whose other pats, which are not necessary to understand the invention, have been omitted for ease of understanding the drawings.

The injection molding mold 1 has a stationary or fixed mold half 11 and a mobile mold half 12. In the closed state of the mold, in which the two halves contact one another in a mold-separating plane 13, the two mold halves 11 and 12 enclose a mold cavity 14.

In the middle of the stationary mold half 11, there is a sprue block 111 with a sprue duct 112 and, following this, a spherical cavity 113 for an injection nozzle of an injection unit (not shown) of the ETI machine.

In FIG. 1, a duct 114 is formed for introduction and discharging a gas under pressure into and from the mold cavity 14 in the lower region of the stationary mold half 11. The duct 114 merges into a funnel-shape widening 115 at its end nearest to the mold-separating plane 13, while, at its end opening onto the base surface of the stationary mold half 11, it has a screw-threaded pressure-tight connecting sleeve 116. At its surface in the mold separating plane 13, the stationary mold half 11 also has a sealing groove 117 which extends in the vicinity of the periphery and which receives a sealing ring 118.

The funnel-like widening 115 of the gas supply duct 114 is situated opposite a distributing chamber 121 which is provided in the mobile mold half 12 and opens into the mold cavity 14. The distributing chamber 121 extends in the shape of a U at right angles to the plane of the drawing of FIG. 1 (see also FIG. 2), with a relatively small depth into the mold-separating plane 13.

Figure 2:
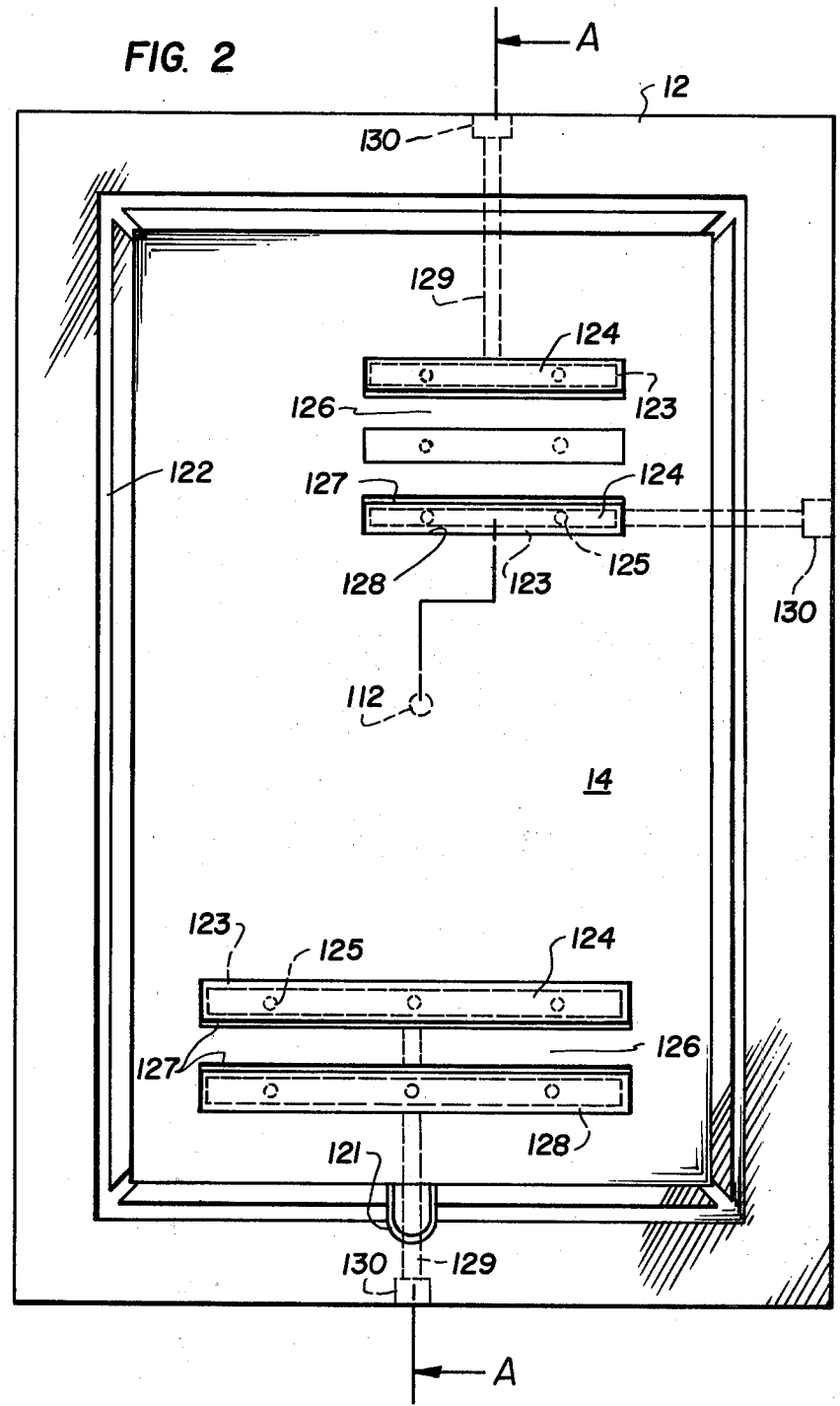
FIG. 2 is an elevational view of the interior of the mobile half of the injection molding mold of FIG. 1.

A distributing groove 122, in the mobile mold half 12, encircles the mold cavity 14 in that surface which lies in the mold-separating plane 13, and is connected to both sides of the distributing chamber 121 and to the four corners of the mold cavity 14 (see FIG. 2). Three recesses 123 are also shown in the mobile mold half 12, above the level of the sprue duct 112, and below these, there are two further recesses 123. In each of these, a mold core 124, which is secured by means of a screw bolt 125 is inserted. The sections of the mold cores 124 which project into the mold cavity 14 define intermediate spaces 126 in the cavity.

Except for the central recess of the upper three recesses 123, a capillary-action, gas-pervious gap 127 is provided adjacent the other recesses 123 and the mold cavity 14, in each case, between a recess wall which is directed toward the intermediate space 126 and the mold core 124. Mold cores 124 in the region of recesses 123 adjacent the recesses 123 are stepped back on all sides relative to the recess wall and thus form chambers 128 which, in each case, communicate by way of the associated gap 127 with respective intermediate spaces 126.

The chambers 128 in the two outer recesses of the upper three recesses 123 which, in fact, each communicate with the relatively small intermediate space 126 between the central mold core 124 are devoid of a gap. One of the two outer cores 124 are connected by way of respective venting ducts 129 with respective connecting sleeves 130 opening onto the surface of the mobile mold half 12.

A common venting duct 129 which interconnects chambers 128 and which also leads to a connecting sleeve 130 at an outer surface of the mobile mold half 12 is associated with the chambers 128 in the two recesses 123 which are formed below the level of the sprue duct and which are connected by way of the associated two ducts 127 to a relatively large intermediate space 126.

A pressure gas bottle 2 may be connected to the mold cavity 14 by way of a conduit 21 connected to the connecting sleeve 116 of the gas supply duct 114 by means of a charging/discharging valve 22 arranged in that conduit.

It is also advantageous to provide a separate discharging valve 23, whose outlet leads to atmosphere, between the charging/discharging valve 22 and the connecting sleeve 116 of the duct 114.

A 2/2-way shutoff valve 3 with a remote control connection 31 for electrical operation is connected, in each case, by way of a connection 32 to the two venting ducts 129, which are shown in FIG. 1, and which start from the chambers 128 of the uppermost and the two lowest recesses 123, respectively. A similar shutoff valve 3 controls the venting duct 129 (see FIG. 1) starting from the chamber 128 of the lowest of the upper three recesses 123 and at right angles to the plane of the drawing in FIG. 1, but it is not visible in FIG. 1.

The remote control connections 31 of the shutoff valves 3 are connected, in each case, by means of an electrical line 33, to a programmable arrangement for controlling the injection unit (not shown) of the ETI machine. The outlets of the shutoff valve 3 communicate with atmosphere.

In FIG. 2, contours in full lines show the position of the recesses 123 with the mold cores 124 arranged therein and the gaps 127 provided therebetween in the mobile mold half 12, and also the form of the distributing groove 122 encircling the mold cavity 14, together with the connected distributing chamber 121 in front view.

Also indicated by means of contours shown in broken lines are chambers 128 constituted in the recesses 123 by stepping-down the mold cores 124, the venting ducts 129 connected thereto, along with their connecting sleeves 130, the screw bolts 125 for securing the mold cores 124 and the mouth of the sprue duct 112, which is situated in the mold-separating plane 13.

Figure 3:
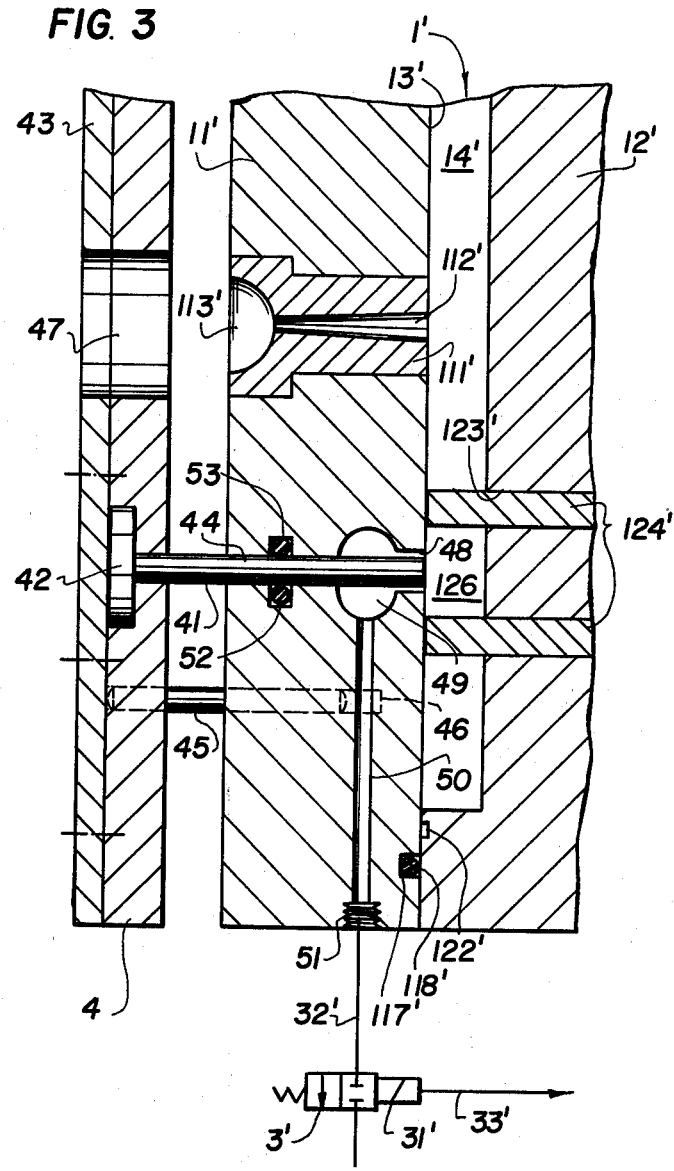
FIG. 3 is a partial vertical sectional view, similar to FIG. 1, of another embodiment of injection molding mold.

In the embodiment of the invention shown in FIG. 3, an injection molding mold 1' may be used. The two mold cores 124' are arranged in stationary manner without a gap in the recesses 123' of the mobile mold half 12' in FIG. 3 similarly to the central of the upper three mold cores 124 in FIG. 1.

At the side of a stationary mold half 11', opposite a mold cavity 14', there is a half an ejector plate 4 which can be displaced in, and opposite to, the direction of injection. Each ejector pin 41 is secured in a known manner in the ejector plate 4 by means of a flange 42, with these being held securely by a cover plate 43 screwed to the ejector plate 4 at its surface which is remote from the stationary mold half 11'. Only in FIG. 3 is the ejector pin 41 situated in the drawing plane of this illustration, visible.

Each of the ejector pins 41 extends through an ejector hole 44 in the stationary mold half 11', with the free end thereof being shown in the retracted position of the ejector plate 4 in the mold-separating plane 13'.

Only in FIG. 3 is the ejector hole 44, shown in section through the drawing plane, visible. For the ejecting and returning movement of the ejector plate 4, any known suitable mechanical, hydraulic or other driving means is advantageously provided, but has not been represented. The ejector plate 4 is guided by means of a plurality of guide pins 45 which slide in suitable holes 46 of the stationary mold half 11'. In FIG. 3, only one guide pin 45 is shown with outlines partly indicated by broken lines.

Ejector plate 4 is also provided with an opening 47 which is coaxial with the sprue duct 112', in order to allow the entry of the injection nozzle of the injection unit (not shown) of the ETI machine into the nozzle cavity 113'.

In the end region of the ejector holes 44 which opens into the mold cavity 14 there is, in each case, a capillary action, gas-pervious gap 48 surrounding the ejector pin 41 in an annular fashion and, connected therewith, a chamber 49 which is also widened in an annular fashion.

Each widened chamber 49 is again connected by way of a venting duct 50 and a connecting sleeve 51 to a connection 32' similar to the embodiment of FIG. 1 and then, in each case, to a 2/2-way shutoff valve 3', whose outlet is directed out to atmosphere.

In the region of the ejector hole 44, which extends from the annularly widened chamber 49 in the direction of the ejector plate 4, a sealing groove 52, which receives a sealing ring 53, is provided in each case.

The ejector plate 4 may be arranged in a known manner together with the ejector pins 41 instead at the mobile mold half 12 and, of course, there would then also be provided in the mobile mold half 12, the arrangement for pressure relief and venting of a gas cushion entrapped in the intermediate space 126, comprising the gap 48, the annularly widened chamber 49 and venting duct 50 with connecting sleeve 51.

The two constructional forms of the invention which are shown in FIGS. 1 to 3 allow operation by the method which will now be described.

When the melt which has flowed in under the injection pressure through the sprue duct 112 spreads out in the mold cavity 14, a flow front is formed which progresses in an arcuate formation substantially in all directions.

As can easily be seen in FIG. 2, during the simultaneous spreading-out of the material both in an upward and in a downward direction, the flow front, on reaching the first mold core 124 in the particular direction of flow in question, adapts itself to the shape of the surface of the said core at the gate side and then flows about the two end surfaces thereof, approximately simultaneously closing the two ends of the intermediate space 126 of the first and second mold cores 124, considered in the direction of flow.

At this instant, the shutoff valve 3, which up to that point had been closed, is opened by its remote control connection 31 in response to a signal of the programmable arrangement for controlling the injection unit. Thus, the shutoff valve 3 vents the intermediate space 126 which has just been enclosed, namely, in each case, by way of a venting duct 129 or 50 and at least one chamber 128 or 49 and a gap 127 or 48, respectively.

An intermediate pressure relief of the gas cushion, which is trapped in this intermediate space 126, occurs, and would prevent this space from being filled by the melt, with the gas cushion then being displaced to atmosphere by way of the open shutoff valve 3 by the melt rapidly entering the intermediate space 126, before the slowing down flow front solidifies.

The operation described is repeated at each intermediate space 126 which is successively reached and surrounded by the flow front subsequently in the course of the mold-filling process.

In this way, it is possible to ensure that all of the portions of the mold cavity which hitherto have been inaccessable because of gas inclusions remaining enclosed can be filled without leaving any gaps and, at the same time, these have the desired smooth surface.

While specific embodiments of the invention have been shown and described in detail to illustrate the application of the principles of the invention, it will be understood that the invention may be embodied otherwise without departing from such principles.

What is claimed is:

1. A method of injection molding articles of foamable plastic material having a smooth surface and an expanded cellular core, using a closable mold having a sealable mold cavity with a gas therein and at least one fixed mold core extending into the mold cavity, with at least one intermediate shadow space of the mold cavity adjacent the mold core, comprising: injecting a melt of the plastic material containing a foaming agent into the cavity against the counter-pressure of the gas which is provided to prevent expansion of the melt during the mold filling operation, the flow front of the melt spreading out in all directions within the cavity and thereby the gas being progressively displaced while the melt flows around the mold core and tends to form inclusions of pressurized gas in the intermediate shadow space; venting the gas which is progressively displaced from the cavity as the melt flows around the core and forms the inclusion of pressurized gas in the intermediate shadow space adjacent the core; and separately venting each inclusion of pressurized gas adjacent each core immediately after it has been enclosed by the melt.

2. A method of molding articles of plastic, as claimed in claim 1, wherein gas is removed from the shadow spaces through a capillary action venting pass under the action of the capillary action of the gas in the shadow space areas.

3. A method of molding articles of plastic, as claimed in claim 1, wherein there are a plurality of mold cores having areas adjacent the mold cores which tend to form a gas inclusions including separately removing and venting the areas.

4. A method of molding articles of plastic, as claimed in in claim 3, wherein each of the areas tending to form inclusions is vented in accordance with the buildup of pressure in these areas during the various stages of filling the mold.

5. A method of molding articles of plastic, as claimed in claim 1, wherein the mold includes a mold portion having a recess therein containing a portion of the mold core and including; positioning the mold core so as to form a capillary passage between the mold core and the mold part and wherein the mold is vented by venting the capillary passage.

6. A method of molding articles of plastic, as claimed in claim 5, wherein there are a plurality of recesses in said mold part, each containing a mold core which has a portion in said recess and a portion in said cavity and which is spaced from the walls of said recess so as to define a capillary flow passage and including venting said capillary flow passage so as to vent at least one of them from a different time than the others.

7. In an apparatus for molding foamed plastic articles having a smooth surface and a porous core, comprising a mold having a sealable mold cavity, a sprue connected into the mold cavity for injecting a plastic melt containing a foaming agent into the cavity, means for supplying a gas under pressure for the cavity with the plastic melt being injected against the counter-pressure of the gas to prevent expansion of the melt during the mold filling operation, means for discharging the gas progressively displaced by the melt as the mold cavity is filled, and at least one fixed mold core projecting into the cavity around which the melt flows and tends to form an inclusion of pressurized gas in a flow shadow space adjacent the core; an improvement comprising: venting means separate from the means for discharging the gas including a vent line extending from the shadow space of each core and out of the cavity; and valve control means connected to said vent line to open said vent line at a selected time during the mold filling operation when the gas inclusion is being formed to additionally relieve the gas inclusion in the flow shadow behind the core.

8. An apparatus for molding plastic articles, as claimed in claim 7, wherein said vent line includes at least one capillary-action, gas-perveous passage.

9. An apparatus for molding plastic articles, as claimed in claim 7, wherein said mold includes a mold portion having at least one recess therein, said mold core having a portion in said recess and projecting into said cavity, said recess having a small diameter passage defined therein around said mold core connected to vent line, said small diameter passage comprising a capillary-action, gas-perveous passage.

10. An apparatus for molding plastic articles, as claimed in claim 7, wherein said mold includes a mold portion having a plurality of recesses therein, a plurality of mold cores engaged in the recesses of said mold part and having portions projecting into said cavity, each of said mold cores defining, with the recesses, small diameter capillary-size passages connected to said vent line of a size such that the melt does not penetrate into the passages.

11. An apparatus for molding plastic articles, as claimed in claim 8, wherein said mold part includes an elongated part forming a chamber connected to said capillary passages, said valve control means comprising a shutoff valve and a remote control connected to said shutoff valve for operating said valves.

12. An apparatus for molding plastic articles, as claimed in claim 9, wherein said mold cores have a stepped portion so that they define with the recess in said mold part a small diameter capillary portion passage and a larger diameter chamber.

13. An apparatus for molding plastic articles, as claimed in claim 9, wherein said mold part comprises a movable mold part, said mold including a fixed mold part against which said movable mold part is movable.

14. An appartus for molding plastic articles, as claimed in claim 10, wherein said vent line comprises a separate line connected to each of said capillary passages, said valve control means comprises a separate shutoff valve for each of said vent lines, and a programming device connected to said vent lines for regulating the time in which said vent lines are open during a molding operation.

15. An appartus for molding plastic articles, as claimed in claim 14, wherein said programming device is adapted to be programmed to cause opening of said shutoff valves at points in time which can be selected by reference to the progress of the injection operation.

16. An apparatus for molding plastic articles, as claimed in claim 7, wherein said at least one mold core comprises two spaced apart mold cores defining said flow shadow space therebetween in said mold cavity, an ejector plate having an ejector pin, said mold including a portion having a opening through which said ejector pin extends communicating with the space between said mold cores, said pin being insertable in said opening and defining a capillary-size passage between said pin and the walls of the opening for the escape of gas in the space between said mold cores.

17. An apparatus for molding plastic articles, as claimed in claim 16, including a widened portion of said mold part forming a chamber communicating with said capillary passages.

18. An apparatus for molding plastic articles, as claimed in claim 7, including at least one capillary action-, gas-perveous passage having a diameter of from 0.02 mm to 0.04 mm.

* * * * *